Feb. 18, 1964 H. M. RICHARDSON ET AL 3,121,446
NONWEEPING, NONCORROSIVE PIPE
Filed Feb. 17, 1956

INVENTORS.
HENRY M. RICHARDSON
WESLEY S. LARSON
BY JOHN M. DEBELL

Chapin & Neal

ATTORNEYS

United States Patent Office 3,121,446
Patented Feb. 18, 1964

3,121,446
NONWEEPING, NONCORROSIVE PIPE
Henry M. Richardson, Springfield, Mass., Wesley S. Larson, Hazardville, Conn., and John M. De Bell, Longmeadow, Mass., assignors, by mesne assignments, to The Patent and Licensing Corporation, New York, N.Y., a corporation of Massachusetts
Filed Feb. 17, 1956, Ser. No. 566,323
11 Claims. (Cl. 138—144)

This invention relates to improvements in non-metallic composite pipe.

Pipe formed of synthetic organic plastics has found increasingly wide fields of use because of its lightness, noncorrosive properties, and correspondingly relatively low maintenance cost as compared with metal pipe. The problems involved in providing satisfactory pipe of this character have been in securing adequate strength and toughness, particularly at elevated temperatures, impermeability, and chemical stability. In general, strength has been obtained by the use of reinforcing materials, either by incorporating such materials in a plastic body or impregnating a reinforcing structure such as cellulosic fibres in paper form, or textile materials, with the plastic and, if further reinforcement was needed, winding non-metallic strands such as fibre glass circumferentially and helically about the pipe body. It has also been proposed to form the pipe body of such windings of circumferentially directed asbestos bonded with plastic. Woven fabrics have been proposed as reinforcement, and pipe, formed by extruding a plastic containing various forms of reinforcing fillers, or otherwise forming pipe, as by casting, from so-filled plastic, have been proposed.

Impermeability to liquids at high pressure has been a serious problem particularly with glass fibre-resin pipe. These problems of impermeability involve not only objectionable direct passage of fluid through the walls but also the phenomenon called weeping where fluids are often found to pass through the wall and form droplets without visible discontinuity in the pipe structure.

In general, increased impermeability has been sought by increasing the plastic content of the pipe or lining the reinforced plastic body of the pipe with a lining of impervious plastic or other impervious materials. Attempts have also been made to achieve impermeability by employing an expensive, fine distribution of glass roving according to special geometric patterns. Such expedients, as they are presently used, increase the weight of the pipe and its cost.

It is the principal object of the present invention to meet the above requirements of light weight, strength, and impermeability by providing a composite pipe employing new and novel reinforcement systems which will not permit the escape of fluids under pressure between or along the fibres.

It is a further obect to provide a reinforcing system which not only gives the strength needed but which by its presence tends to decrease the permeability and increases the ability of the structure to withstand continuous exposure to pressure without fatigue failure.

It is a further object of the present invention to provide a construction in which the functional characteristics of the elements combine to enhance the functional characteristics of each, resulting in a more efficient use of materials, superior performance, uniform manufacturing procedures, and lower costs.

In the accompanying drawing; which diagrammatically illustrates various structural embodiments of the invention and illustrates ways and means for carrying out the method:

Conventional asbestos has heretofore been proposed as a filler material for plastic pipe or as a circumferential reinforcement wound around the pipe with the asbestos fibres extending circumferentially and bonded with various plastic materials. Various other fibrous materials have been similarly used, as for example, fibre glass, vegetable fibres, and hair. Extensive experience over the years has shown that the reinforcing fibres should be non-metallic, especially where stray soil currents are involved as in soil burial. In general, rigidity and fluid impermeability, corrosion resistance, and temperature stability have been imparted to the pipe by the plastic used and the fibrous or strand reinforcements have been incorporated to impart mechanical strength and reduce the amount of plastic otherwise necessary to give the needed strength to the pipe.

Furthermore, with organic reinforcing fibres it is important that they be nonwater-absorptive, since otherwise over long periods they absorb water, swell, and fracture the structure unless very carefully waterproofed.

All of the above objectives have been met and the quality of the pipe has been improved by the following novel concepts of construction.

Figure 2:
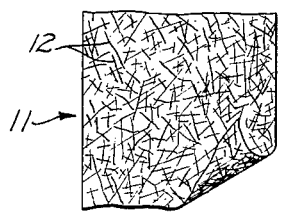
FIG. 2 is a generally perspective view showing one form of reenforcement employed in the structure of FIG. 1.
Figure 3:
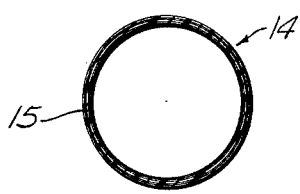
FIG. 3 is a view, similar to FIG. 1, showing an alternative pipe structure.
Figure 4:
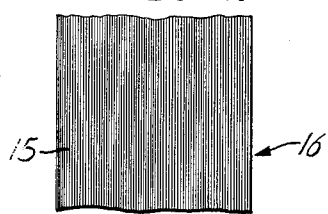
FIG. 4 is a view, similar to FIG. 2, showing the form of reenforcement employed in the structure of FIG. 3.
Figure 5:
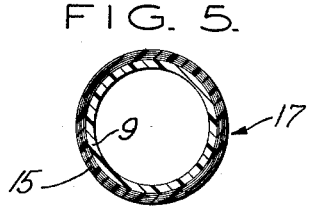
FIG. 5 is a view, similar to FIG. 1, showing the structure of FIG. 3 combined with a liner.

These novel structural features include pipe constructed with an all inorganic cellulose-free fibrous reinforcing system. Advantageously, for reasons later pointed out this system takes the form (FIG. 1) of windings 10 of a paper-thin felt, generally indicated at 11, FIG. 2, composed of asbestos or glass fibres, or both, the fibres, as indicated at 12, being randomly oriented in the plane of the felt. Such random orientation positions a due proportion of the fibres circumferentially of the pipe 13, FIG. 1, in which the system is incorporated. In pipe where circumferential strength is critical a major portion or all of the reinforcing fibres may be oriented in the winding to be directed substantially circumferentially of the pipe 14, FIG. 3, and may take the form, as indicated at 15, FIG. 4, of long glass fibres such as fine glass filament roving 16. In any event and in accordance with the concept of the invention the reinforcing winding as such is of sufficient thinness so that the orientation of the fibres is substantially confined to the plane of the winding. Further, it is equally essential to the concepts of the invention that the winding embodying such reinforcing system be thoroughly impregnated with a thermosetting resin before being wound into pipe form, so that upon curing of the resin the fibres of the winding and the windings are bonded together to form a rigid pipe structure. Further, the windings may surround and "armor" a thermoplastic tube to which the windings are bonded or bound during the curing of the bonding resin of the reinforcing system. Such an "armored" structure is illustrated in FIG. 5 where the thermoplastic tube is shown at 9 with windings of the glass fibres 15 to form a two element pipe 17. The bonding resin should have a low viscosity at temperatures below the curing point of the resin.

Figure 1:
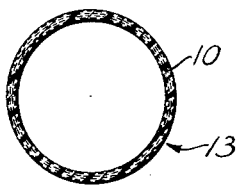
FIG. 1 is a transverse sectional view of a one element pipe.
Figure 6:
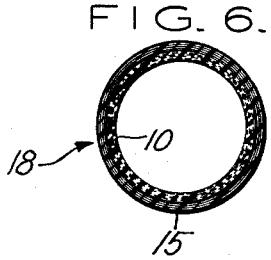
FIG. 6 is a similar view showing a two element pipe combining the structures of FIGS. 1 and 3.
Figure 7:
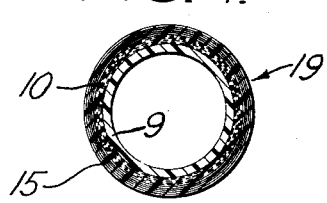
FIG. 7 is a similar view showing a three element pipe combining the structure of FIG. 6 with a liner.

We have found that a reinforcing system comprising asbestos fibres of colloidal fineness, high length-diameter ratio, cellulose free, and randomly felted to paper thinness preferably with glass fibres randomly distributed through the felt, achieves in part the objectives above set forth. We have further found that when such a felt is impregnated, as later fully described, with a suitable resin, and wound or otherwise formed to provide a pipe of desired diameter and thickness, a relatively light single-element pipe is provided which is superior in performance to the pipe presently available and is more easily manufactured at less cost. Furthermore the construction above-described which forms a single-element pipe 13, FIG. 1 may as above-mentioned be utilized to construct a two element pipe as indicated at 18, FIG. 6, in which the windings 10 of FIG. 1 are provided with windings of the glass fibres 15, or to construct a three element pipe 19 as in FIG. 7 where a lining is incorporated in the structure of FIG. 6 by applying the windings 10 and 15 over the thermoplastic tube 9 to provide superior heavy-duty or special-service pipe, with a minimum of alteration in manufacturing procedures.

Asbestos fibre having the above-mentioned characteristics may be produced in accordance with the methods disclosed in the patent to Novak 2,626,213 and the "paper" produced as disclosed in this Novak patent from a water dispersion, with fine glass fibres randomly incorporated therein (available from Raybestos-Manhattan Co. under the trade name "Novabestos"), provides in general an acceptable "felt" for the purposes of our invention, provided any remaining or excess of the wetting agent is burned off. A characteristic of the fibres of the character disclosed in the above patent which we have found to be particularly useful in this application is the ability of the asbestos, when in the ultimate matrix, to reinforce the resin sealing the apertures between glass fibres, thus greatly reducing the weeping noted in pipes with no such asbestos content.

However produced, the asbestos or other inorganic fibres entering into the reinforcing system of the present invention should be free of cellulose, the majority of the fibres should be of unit size; that is, the fibres should be individualized and of extremely small diameter—of the order of between 200 and 500 angstroms—and of high length-diameter ratio and capable of forming a water dispersion from which a dense but relatively thin mat or felt can be formed with glass fibres added as desired, all of the fibres being randomly arranged and providing a universally directed reinforcement in the plane of the mat or felt. When fibres of the character described are so formed in a felt of paper thinness, the full strength of the fibres is realized and fibre movement transversely of the plane of the felt, as tension is applied, is substantially eliminated. The elimination of such transverse movement—which movement is exemplified in an exaggerated degree when the warp and weft of a woven fabric is drawn taut under tension or when the weft of a so-called weak-weft fabric is intentionally allowed to break, or when the convolutions of conventionally circumferentially wound strands of filaments or conventional roving compact or slip past one another, as such windings are condensed under tension—is important in the stability of the plastic-to-reinforcement union in the composite pipe, the achievement and maintenance of the impermeability and rigidity of the composite pipe, and the unitary response of the plastic and reinforcing system during all phases of pipe performance which are characteristic of our improved construction.

While pipe employing reinforcing materials as described above possesses exceptional strength properties at normal temperatures, it will be recognized that performance at elevated temperatures depends almost entirely on the resinous binder. Many resinous materials having adequate strength at low temperatures lose a major portion of this strength at service temperatures in the vicinity of boiling water (100° C. or 212° F.), even though these resins are classified as being of the thermoset type and are suitable for many pipe uses. This deficiency may, however, in many cases be critical, but we have found that certain combinations of epoxy and phenolic resins described more fully below possess the ability to retain at 100° C. as much as 90% of the strength they possess at room temperature, i.e. about 25° C. Such strength retention properties of the resin greatly widen the utility of pipe made therefrom in combination with the above-described reinforcing materials.

The fibre-plastic combination of the present invention has the effect of eliminating porosity in the composite structure, achieving both strength and impermeability in a degree impossible with either structure alone. A variation applies windings of glass roving or similar continuous members such as oriented terephthalate tape, polyethylene terephthalate filament and similar materials in a resin matrix about the outer surface of the described glass or glass-asbestos-resin pipe, or continuous windings of such materials helically and/or circumferentially about a thermoplastic liner.

In structures where a thermoplastic inner member is employed, the principal function of the inner member is to decrease or eliminate porosity; the thermoplastic achieves this by its homogeneity, and the glass-asbestos-resin by bridging the apertures between glass fibres with the finer asbestos. The inner member serves also to distribute the stresses more evenly so that internal pressure may be better and more uniformly borne by the reinforced outer layer.

A further important effect of this general combination of elements is in the distribution of circumferential stress throughout the thickness of the pipe, especially valuable in the smaller pipe sizes. In a hollow, thick-walled cylinder subjected to internal pressure, the major portion of the hoop stress is borne by the inner layers. By using a relatively circumferentially inextensible layer on the outside of the tube, the circumferential elongation of the inner layer is limited, thus limiting the maximum tensile stress thereon, and giving rise to a more uniform stress distribution on this inner member. The tension applied to the outer member is thus diminished by this amount, but, depending on the elasticity of the two members, continues to be a relatively large value. This transfer of tension to the strong outer member may be enhanced by tightly winding the continuous fibres and/or by shrinkage of the outer member about the liner due to normal curing shrinkage of the resin of the outer layer, giving rise to a compressive force in the liner while the pipe is in its "unstressed" state. This is analogous to autofrettage or "laying-up" in the gun-making art, where prestressing allows greater pressures in gun barrels of no greater weight.

Furthermore, the tension wrapping of the reinforcement around a thermoplastic pipe as a mandrel effects an integral seal between the thermoplastic and the reinforcement so that there is little tendency for liquid under pressure to travel along the interface.

The preferred resins employed in our construction must meet certain requirements. Because these pipes are preferably formed and fabricated under relatively low pressure, the resin impregnant must be one which has low viscosity and good penetrating power into the reinforcing material at low working temperatures. A further requirement, under such fabricating conditions, is that the low viscosity starting resin "cure" to a thermoset resin rapidly and without the necessity of high temperatures. Still further, it is required that the "curing" of the resin not involve the volatilization of solvent or release of volatile material produced incidental to the curing of the resin, since such volatilization would weaken the final structure by leaving voids or undensified areas.

A preferred class of resins, where high service temperatures are not involved, for use in the reinforcing system, are the so-called polymerizable polyesters which are obtained by esterifying to a partial polymer unsaturated dibasic acids such as maleic, with dihydric alcohols such as ethylene and propylene glycol, and which cure without liberation of water or gases. Many variations of the above general type are available using mixed unsaturated and saturated dibasic acids and various glycols. The product of this esterification is a viscous or semisolid mass which is then dissolved in a monomeric material, preferably, but not necessarily, styrene, to adjust the viscosity to a suitable range, preferably between 50 and 200 cps. at 20° C. The monomeric material serves both as a solvent—and consequently a viscosity adjuster—and also as a comonomer or cross-linker in causing the curing of the polyester resin. By way of example a styrene solution containing approximately 57% of the polyester resin gives a viscosity of 80–100 cps. at 20° C. As such, the monomeric material is converted to a solid, integral with the polyester and the final structure, and does not have to be eliminated by volatilization.

An exemplification of this class of resins may be prepared as follows:

1.75 mols phthalic anhydride
1.25 mols maleic anhydride
2.1 mols diethylene glycol
1.0 mol propylene glycol reacted nine hours under nitrogen, with 0.02% hydroquinone as inhibitor, at a temperature of 140° to 222° C. Xylene used for azeotropic separation of water, later removed by vacuum stripping 1 hour at 185° C.; acid number approximately 49. 70 parts of this resin with 60 parts styrene gives a solution having a viscosity of 100 cps. at room temperature.

Satisfactory resins of this class are commercially available under the names Plaskon 951 (Libby-Owens-Ford Glass Co.), AR 403 (General Electric Co.), Selectron 5003 (Pittsburgh Plate Glass Co.) and Vibrin 114 (United States Rubber Co.). There resins can be extended, as found desirable, with non-reinforcing fillers such as kaolin.

For maximum strength at elevated temperature, as above pointed out, we have found that a mixture of phenolic-type resin with an epoxy resin confers the best properties. Since most phenolic resins cure with the liberation of water which must be eliminated, and this is undesirable as described above, only certain phenolic resin types are suitable. The preferred type is a condensation product of one mol aniline, 2 mols phenol, and 4.7 mols formaldehyde which has been dehydrated quickly and under mild conditions so that the resin remains fusible. Further, this resin, while solid at room temperature, melts to a low viscosity below 100° C. and on being held at this or higher temperatures cures hard without the evolution of gases. A suitable resin of the above type is commercially available under the designation General Electric 12337.

We have found that such phenolic resins possess the optimum in strength retention at elevated temperatures when used in conjunction with epoxy resins. These epoxy resins are reaction products of epichlorhydrin with bisphenol which may be condensed to linear polymer chains and then under the influence of a diamine cure to a thermoset structure. Such resins are available commercially in varying grades depending upon the molecular weight of the linear condensation product. For our purposes, we prefer the lowest available molecular weight, since these possess the lowest viscosity (of the order of 12400 cps. at 20° C.) and also the greatest percentage of active groups (epoxide equivalent of 190 to 210) and consequently give the hardest cure. A commercially available epoxy resin of the preferred type is Epon 828 (Shell Chemical Corp.). When used with a phenolic resin as described above, it is unnecessary to add a diamine catalyst to cure the epoxy since the phenolic resin itself acts as a curing agent.

The epoxy resin and the phenolic are miscible and co-curable in wide proportions, but we have found that the optimum in strength retention at elevated temperatures is obtained when the phenolic and the epoxy, as described above, are mixed in substantially the proportions of 2:1, respectively.

These phenolic and epoxy resin mixtures having low viscosity below the curing point of the mixture, in addition to the advantages above described permit of the continuous and rapid progressive production of pipe in accordance with the method later described, since the desired viscosity for proper saturation of the reenforcing structure and at least a partial cure of the resin, sufficient to render the structure self-sustaining, are within a temperature range subject to control under manufacturing practice.

The principles described in the foregoing are illustrated in the following examples, which are intended to be illustrative only and not limiting.

*Example I*

A pipe consisting of seven helically-wrapped, overlapping layers of the heat cleaned Novabestos paper thoroughly impregnated with a resin made of 100 parts by weight of Plaskon 951 polyester resin, 50 parts of styrene monomer, 3 parts of benzoyl peroxide catalyst, and .6 part of diethyl aniline accelerator. The resin is applied to each of the webs at its initial viscosity of 80 cps., the laminate is made immediately according to the process described below, and cured under heating power of about 3 watts per square inch at about 185° C. in about 5 minutes. Pot life of the resin is sustained by continuous additions of fresh material. The pipe, after a 4-hour postcure at 150–175° C., sustains pressures of over 600 p.s.i. for short times at room temperature; on a .140-inch wall, at 4 inches diameter, this is about 8500 p.s.i. hoop stress.

*Example II*

A pipe consisting of nine helically-wrapped, overlapping layers of heat cleaned Novabestos paper thoroughly impregnated with a resin mixture made of two parts by weight of General Electric 12337 aniline resin and one part of Shell Epon 828 epoxy resin. The temperature of the mixture was raised to approximately 90° C. to bring the resin mixture to a viscosity (2,000–10,000 cps.) permitting the resin mixture to be doctored onto the paper, the temperature was further increased (approximately 212° C.) to further reduce the viscosity of the resin mixture and cause it to flow into the interstices of the paper (or it may be so heated and initially applied as a light liquid) and allow the resin to form a continuous phase in the laminate structure during the progressive formation of the structure by the helical winding of the so-impregnated paper, the laminate structure being thereafter postcured at approximately 129° C. for approximately four hours. Resin mixtures of this or similar composition provide retention of 93% of room temperature strength at 135° C.

*Example III*

A pipe consisting of a 1¾ inch diameter acetate butyrate tube ⅟₁₆ inch thick, wound with 25 feet of glass roving per foot of pipe and impregnated with General Electric AR 403 polyester resin, filled with 30% kaolin, catalyzed with 1% of a benzoyl peroxide catalyst and 1% diethyl aniline accelerator. This was cured for 2 hours at 160° F., and sustained 600 p.s.i. in instantaneous burst.

*Example IV*

A pipe consisting of a 1¾ inch diameter acetate butyrate tube .060 inch thick with four layers of 2 inch wide heat cleaned Novabestos paper tapes helically wound. The tapes were impregnated with Pittsburgh Selectron 5003 resin with one part per hundred of a benzoyl peroxide catalyst and one part diethyl aniline accelerator cured 2 hours at 160° F. Pipe of this construction burst at 1200 p.s.i. internal pressure.

Rigid vinyl chloride has been found useful and various types of high- and low-pressure ethylene, extrudable acrylonitrile copolymers, and other acrylate derivatives may be used. It will be understood that with extremely nonpolar types like ethylene it is desirable to apply adhesion-promoting processes such as flaming or ozone treatment to improve the bond.

Plastic pipe of the foregoing types may be continuously produced on commercially-available equipment of types in long use in the paper-tube-winding industry. These machines, FIG. 8, ordinarily grip two or more plies of glue-coated paper beneath an endless belt 20 so arranged that it is driven by two vertical pulleys 21 and pulled at a helical angle 360 degrees around a horizontally-disposed cylindrical mandrel 22. The innermost and outermost plies of this laminate are unglued, so that they may slide freely on the mandrel and not become adhered to the belt or to the mandrel. The action of the belt pulls the tapes onto the mandrel and drives them helically along the mandrel, which is long enough to afford time to complete the drying of the glued layers into a structural unit.

Figure 8:
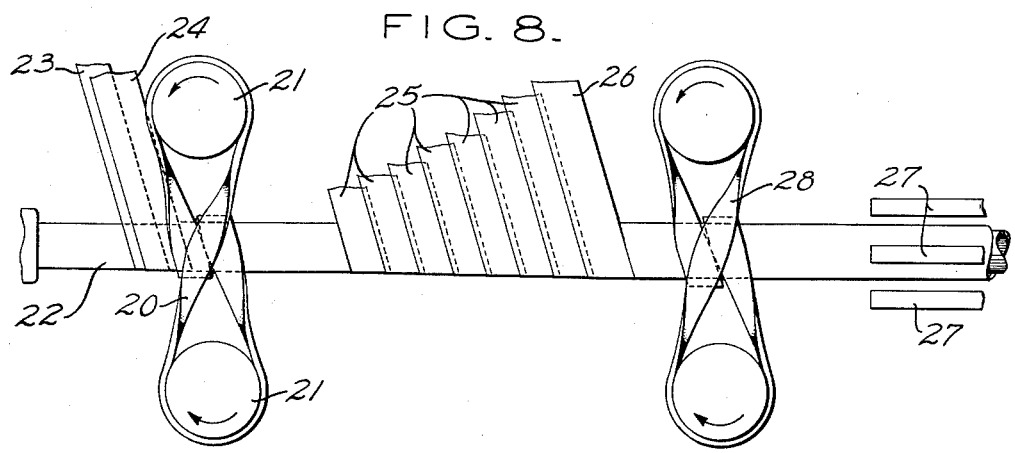
FIG. 8 is a plan view of means for use in manufacturing the pipe herein disclosed.

In our invention it is required to effect at least a partial cure of the resins before they leave the support of the mandrel. Ordinarily, in so curing the resin, it passes through a liquid stage into a solid or quasi-solid state; this transformation requires that the mandrel be shielded from resin. This is accomplished by a novel means which serves two functions. One or more layers of a material like chipboard, as at 23, FIG. 8, are wound on the mandrel 22 to form a disposable tube or core; these layers may or may not be glued together. Over this core is laid a helix of cellophane 24 or similar parting agent. When this cellophane is wider than the pitch of the helix, it tends to lock itself around the inner cardboard core to form a load-sustaining core even without the aid of glue. This structure is wound in the manner common in tube-winding practice. Tapes of the reinforcing material 25 are then wound over this core, which as described has both load-carrying and surface-parting properties. These tapes have been previously saturated with the bonding resin, which at the time of winding is in a state of relatively low viscosity. A final helical wrap of cellophane 26 may be applied, where air hinders the cure of the resin, to insure a good cure. The core advances this structure continuously along the mandrel, about which are situated suitable heating devices 27, as, for example, infrared lamps or electric heaters, which raise the resin temperature to that necessary for cure. The heat and resin curing properties are so adjusted that the resin is completely cured or at least is hard enough to sustain at least moderate loads when it leaves the support of the mandrel. If curing is not completed during the travel of the assembly on the mandrel the curing may be completed in any suitable manner, as in an oven. In either case following the final cure of the laminate, the cellophane and chipboard core and covering are removed. It is desirable, though under some conditions not essential, to have a second winding belt as indicated at 28 to help pull the laminate along the mandrel; this should have a suitable means, not shown, for so adjusting the speeds of the two belts that the effect of any difference of surface speeds between the core and the full laminate is overcome.

The application of resin to the filler webs may be accomplished in several ways. Where a resin of low viscosity is used, passage of the tape through a resin bath may suffice; this may be augmented or replaced by the use of squeeze rolls, doctor blades, reverse-roll coaters, or similar devices. Highly viscous resins or solid resins require different treatments, usually involving the use of heat during or after the coating of the web, to reduce the viscosity sufficiently to allow gravity and/or capillarity to draw the resin into the interstices of the tape.

As has been made apparent above, the present invention provides a pipe construction which is adaptable to meet substantially all working conditions, which substantially extends the field of utility of composite pipe and which assures a maximum of efficient cooperation between the reinforcing system and the resins and greater dependability than structures heretofore available for the purpose. The efficiency of the reinforcing system minimizes the weight of resin required in any given instance, thus providing a lighter weight pipe for a given strength and greater imperviousness than prior constructions. Furthermore, the strength characteristics of the reinforcement and the physical and curing characteristics of the resin together with the method of assembly and curing provide rapid and economical manufacture.

What is claimed is:

1. A rigid pipe comprising a plurality of windings of a paper made up entirely of highly individualized asbestos staple fibres, at least a majority of said highly individualized fibers having a diameter of from 200 to 500 Angstrom units and a length-to-diameter ratio of at least 200 to 1, and staple glass fibres, each of said staple asbestos and glass fibres being essentially oriented in planes parallel to the surfaces of said paper and randomly oriented in said planes, said paper being essentially free of organic compounds, said windings and the fibres therein being bonded together by a cured, thermosetting resin impregnation of the paper.

2. A rigid pipe as in claim 1 in which the said windings are superposed on a hollow core of a rigid thermoplastic resin.

3. A rigid pipe as in claim 1 in which the said windings are superposed on a hollow core of acetate butyrate.

4. A rigid pipe as in claim 1 in which the bonding resin impregnation comprises a cured solution of a polymerizable polyester resin in styrene monomer, the solution containing approximately 57% polyester resin, and having a viscosity at 20° C. of 80–100 cps.

5. A rigid pipe comprising a plurality of windings of a paper made up entirely of high individualized asbestos staple fibres, at least a majority of said highly individualized fibres having a diameter of from 200 to 500 Angstrom units and a length-to-diameter ratio of at least 200 to 1, and staple glass fibres, each of said staple asbestos and glass fibres being essentially oriented in planes parallel to the surfaces of said paper and randomly oriented in said planes, said paper being essentially free of organic compounds, said windings and the fibres therein being bonded together by a cured mixture of an epoxy resin and a phenolic resin.

6. A rigid pipe as in claim 5 in which the bonding resin impregnation comprises a cured mixture of an epoxy resin and a phenolic resin, in which the phenolic resin contains aniline, phenol and formaldehyde.

7. A rigid pipe as in claim 5 in which the bonding resin impregnation comprises a cured mixture of phenolic and epoxy resins having, before cure, a viscosity at 90° C. of 2,000–10,000 cps.

8. A rigid pipe as in claim 5 in which the bonding resin impregnation comprises a cured mixture of (a) a fusible, dehydrated phenolic condensation product, and (b) the condensation product of epichlorohydrin with bisphenol having a viscosity of approximately 12,400 cps. at 20° C. and an epoxide equivalent of 190 to 210.

9. A rigid pipe as in claim 5 in which the bonding resin impregnation comprises a cured mixture of (a) the fusible dehydrated condensation product of one mol aniline, two mols phenol, and 4.7 mols formaldehyde, and (b) the condensation product of epichlorohydrin with bisphenol having a viscosity of approximately 12,400 cps. at 20° C. and an epoxide equivalent of 190 to 210.

10. A rigid pipe comprising a rigid core formed of acetate butyrate covered by a plurality of superposed windings of paper made up of inorganic fibres substantially all of the fibres being oriented in the plane of the paper and in part at least extending circumferentially of the pipe, and fibres comprising glass filament roving bonded together by a cured thermoset resin impregnation of the paper, said bonding resin comprising a cured solution of a polymerizable polyester resin in styrene monomer, the windings being bonded together by said resin at the interface of the windings, and to the core by said resin at the interface of the core and windings.

11. A rigid pipe comprising a core of acetate butyrate covered by a plurality of superposed windings comprising a paper-thin, cellulose-free felt of randomly oriented individualized asbestos and glass fibres bonded together by a cured impregnation of a solution of a polymerizable polyester resin in styrene monomer.

References Cited in the file of this patent

UNITED STATES PATENTS

| | | |
|---|---|---|
| 2,184,326 | Thomas | Dec. 26, 1939 |
| 2,467,999 | Stephens | Apr. 19, 1949 |
| 2,594,838 | Alexander et al. | Apr. 29, 1952 |
| 2,614,058 | Francis | Oct. 14, 1952 |
| 2,620,851 | Brown | Dec. 9, 1952 |
| 2,653,887 | Slayter | Sept. 29, 1953 |
| 2,742,931 | De Ganahl | Apr. 24, 1956 |
| 2,747,616 | De Ganahl | May 29, 1956 |
| 2,787,542 | Labino | Apr. 2, 1957 |
| 2,788,052 | Schulman | Apr. 9, 1957 |
| 2,814,313 | Tate | Nov. 26, 1957 |
| 2,815,043 | Kleiner et al. | Dec. 3, 1957 |
| 2,854,031 | Donaldson | Sept. 30, 1958 |
| 2,857,932 | Calderwood | Oct. 28, 1958 |
| 2,862,524 | Smith | Dec. 2, 1958 |
| 2,978,529 | Brisley et al. | Apr. 4, 1961 |